(12) United States Patent
Jarrett et al.

(10) Patent No.: US 6,795,278 B2
(45) Date of Patent: Sep. 21, 2004

(54) METHOD OF PROTECTING READ SENSORS FROM ELECTROSTATIC DISCHARGE DAMAGE DURING THE MANUFACTURE OF MAGNETIC HEADS

(75) Inventors: James Devereaux Jarrett, San Jose, CA (US); Richard Hsiao, San Jose, CA (US); Ciaran Avram Fox, Sunnyvale, CA (US); Edward Hin Pong Lee, San Jose, CA (US); Thomas Robert Albrecht, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 10/109,511

(22) Filed: Mar. 28, 2002

(65) Prior Publication Data

US 2003/0184920 A1 Oct. 2, 2003

(51) Int. Cl.$^7$ .............................................. G11B 5/127
(52) U.S. Cl. ..................................................... 360/323
(58) Field of Search ................................. 360/323, 319, 360/322, 128; 324/249, 252, 207.21; 29/603.12, 603.13, 603.14, 603.25; 438/3, 132, 128, 129, 130

(56) References Cited

U.S. PATENT DOCUMENTS

| | | | | |
|---|---|---|---|---|
| 5,465,186 A | * | 11/1995 | Bajorek et al. | ............. 360/323 |
| 5,491,605 A | * | 2/1996 | Hughbanks et al. | ........ 360/323 |
| 5,539,598 A | | 7/1996 | Denison et al. | |
| 5,757,591 A | * | 5/1998 | Carr et al. | .................... 360/323 |
| 6,054,330 A | * | 4/2000 | Phipps et al. | ................... 438/3 |
| 6,146,813 A | | 11/2000 | Girard et al. | |
| 6,160,687 A | | 12/2000 | Pinarbasi | |
| 6,162,582 A | | 12/2000 | Hsiao et al. | |
| 6,198,609 B1 | * | 3/2001 | Barr et al. | .................... 360/322 |
| 6,330,136 B1 | * | 12/2001 | Wang et al. | ............. 360/324.2 |
| 6,344,952 B1 | * | 2/2002 | Biskeborn et al. | ........... 360/319 |
| 6,359,750 B1 | * | 3/2002 | Hughbanks et al. | ........ 360/128 |
| 6,427,319 B1 | * | 8/2002 | Cook et al. | .............. 29/603.12 |

* cited by examiner

*Primary Examiner*—Allen Cao
(74) *Attorney, Agent, or Firm*—John J. Oskorep, Esq.

(57) ABSTRACT

Methods and apparatus for protecting read sensors from damage caused by electrostatic discharge (ESD) during manufacturing are described. Two electrical connections are formed and utilized for ESD protection: one primarily for early protection of the sensors (i.e. prior to cutting and lapping the wafer to form the ABS) and the other primarily for later protection of the sensors (i.e. after cutting and lapping the wafer to form the ABS). The first electrical connection is created between the read sensor and the first and second shields, and is severed when the wafer is cut and lapped along the ABS. The second electrical connection is formed between the sensor leads and the first and second shields, and is exposed on an outside surface of the magnetic head. The second electrical connection is severed late in the manufacturing process, preferably by laser-deletion.

20 Claims, 8 Drawing Sheets

METHOD OF PROTECTING READ SENSORS FROM ELECTROSTATIC DISCHARGE DAMAGE DURING THE MANUFACTURE OF MAGNETIC HEADS

BACKGROUND OF THE INVENTION

1. Field of the Invention

The present invention relates generally to magnetic heads and methods of manufacturing the same, and more particularly to protecting read sensors from damage due to electrostatic discharge (ESD) during the manufacture of magnetic heads.

2. Description of the Related Art

Read sensors of magnetic heads are sensitive devices which may be easily damaged during manufacturing by electrostatic discharge (ESD). During manufacturing, a plurality of magnetic heads are formed on a wafer. For each magnetic head, a read sensor is formed over a first gap layer (G1) which has a first shield layer (S1) formed beneath it. Above the read sensor is a second gap layer (G2) which has a second shield layer (S2) formed over it. The first and second gap layers and are made of an insulating material, such as alumina, whereas the first and second shield layers are made of a conductive material, such as Permalloy. Since these conductive materials are separated by the insulating materials, different electrical potentials may exist between the read sensor and shield layers. From the constant handling of the magnetic heads during manufacturing, electrostatic charge may undesirably build up and damage the read sensors. This may result in serious yield losses, especially as the sensor element becomes smaller in both film thickness and areal dimension.

One known method of preventing ESD damage to read sensors forms a temporary electrical connection between the read sensor and the first and second shields. Conventional photolithography and patterning techniques are used during head formation to form holes through the gap layers and extend sensor materials through the holes to make electrical contact with the first and the second shields. Relatively low resistances inherent to the nature and the amount of materials utilized in the connection are created. This temporary connection crosses over a contemplated air bearing surface (ABS) line of the wafer, which is eventually cut and lapped along the ABS line.

This method advantageously prevents ESD damage to read sensors during early phases of manufacturing. However, it fails to prevent ESD damage to the read sensors during later phases of manufacturing (i.e., after cutting and lapping the ABS). Since this single connection is buried within the read sensor, it is difficult if not impossible to sever it late in the manufacturing process.

Accordingly, what are needed are methods and apparatus for protecting read sensors from damage caused by ESD during manufacturing, even after the wafer is cut and lapped along the ABS.

SUMMARY OF THE INVENTION

Methods and apparatus for protecting read sensors from damage caused by electrostatic discharge (ESD) during manufacturing are described. Advantageously, two electrical connections are formed and utilized for ESD protection: one primarily for early protection of the sensors (i.e. prior to cutting and lapping the wafer to form the ABS) and the other primarily for later protection of the sensors (i.e. after cutting and lapping the wafer to form the ABS).

More particularly, a first electrical connection between a read sensor and first and second shields is created during manufacturing for each one of a plurality of magnetic heads being formed on a wafer. Each first electrical connection crosses over a contemplated air bearing surface (ABS) line of the magnetic heads. A second electrical connection is additionally created between sensor leads and the first and the second shields for each one of the plurality of magnetic heads. Each second electrical connection is exposed on an outside surface of a magnetic head. ESD protection is advantageously provided by the first and the second electrical connections until the wafer is cut and lapped along the contemplated ABS line to form the ABS, which severs each first electrical connection. Thereafter, the wafer is cut to separate the plurality of magnetic heads from each other where each head is then processed individually. During the separation and individual processing, ESD damage is advantageously prevented by each second electrical connection. Each exposed second electrical connection is eventually severed, preferably by laser-deletion, so that each magnetic head can be used as intended.

BRIEF DESCRIPTION OF THE DRAWINGS

For a fuller understanding of the nature and advantages of the present invention, as well as the preferred mode of use, reference should be made to the following detailed description read in conjunction with the accompanying drawings:

FIG. 5 is a partial elevation view of the slider and magnetic head as seen in plane V—V of FIG. 2;

DETAILED DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

Figure 1:
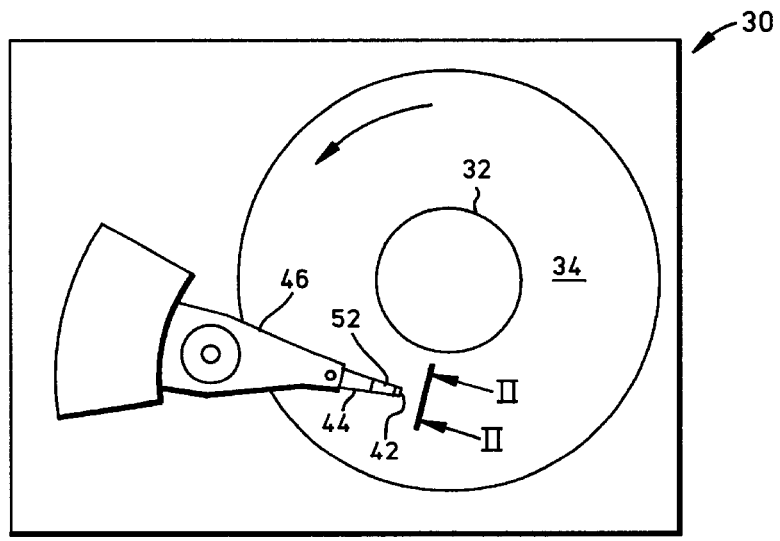
FIG. 1 is a planar view of an exemplary magnetic disk drive.
Figure 2:
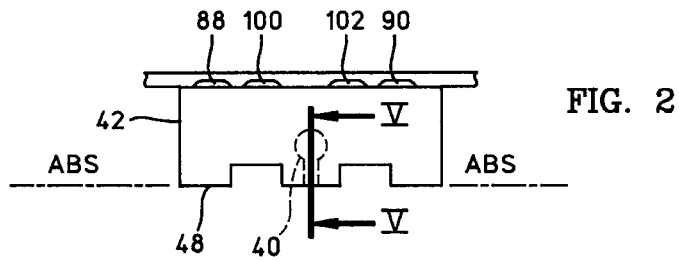
FIG. 2 is an end view of a slider with a magnetic head of the disk drive as seen in plane II—II of FIG. 1.
Figure 3:
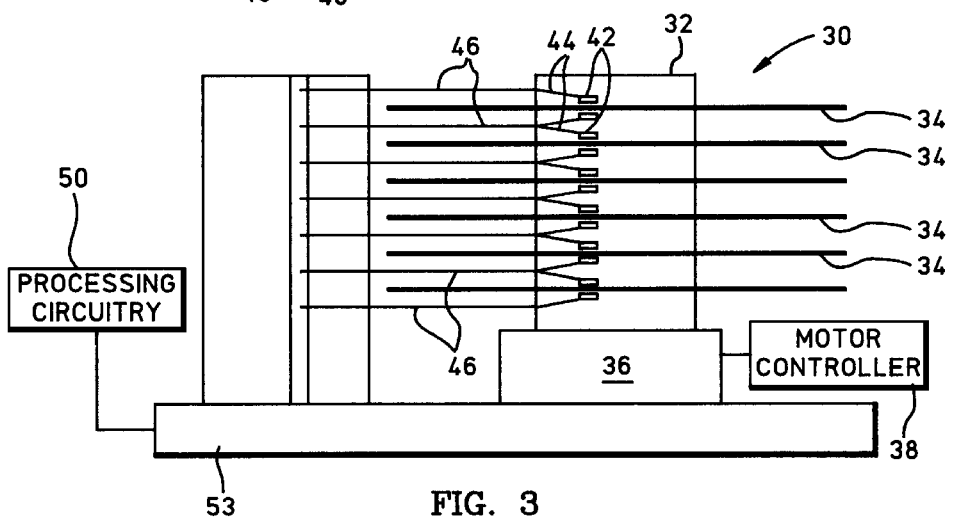
FIG. 3 is an elevational view of the magnetic disk drive wherein multiple disks and magnetic heads are employed.

Referring now to the drawings, wherein like reference numerals designate like or similar parts throughout the several views, as is illustrated in FIGS. 1–3 a magnetic disk drive 30. Disk drive 30 includes a spindle there that supports and rotates a magnetic disk 34. Spindle 32 is rotated by a motor 36 that, in turn, is controlled by a motor controller 38. A horizontal combined magnetic head 40 for reading and recording is mounted on a slider 42. Slider 42 is supported by a suspension 44 and actuator arm 46. A plurality of disks, sliders and suspensions may be employed in a large capacity direct access storage device (DASD), as shown in FIG. 3. Suspension 44 and actuator arm 46 position slider 42 to locate magnetic head 40 in a transducing relationship with a surface of magnetic disk 34. When disk 34 is rotated by motor 36, slider 42 is supported on a thin (typically, 0.02 micrometer) cushion of air (or air bearing) between disk 34 and an air bearing surface (ABS) 48.

Figure 4:
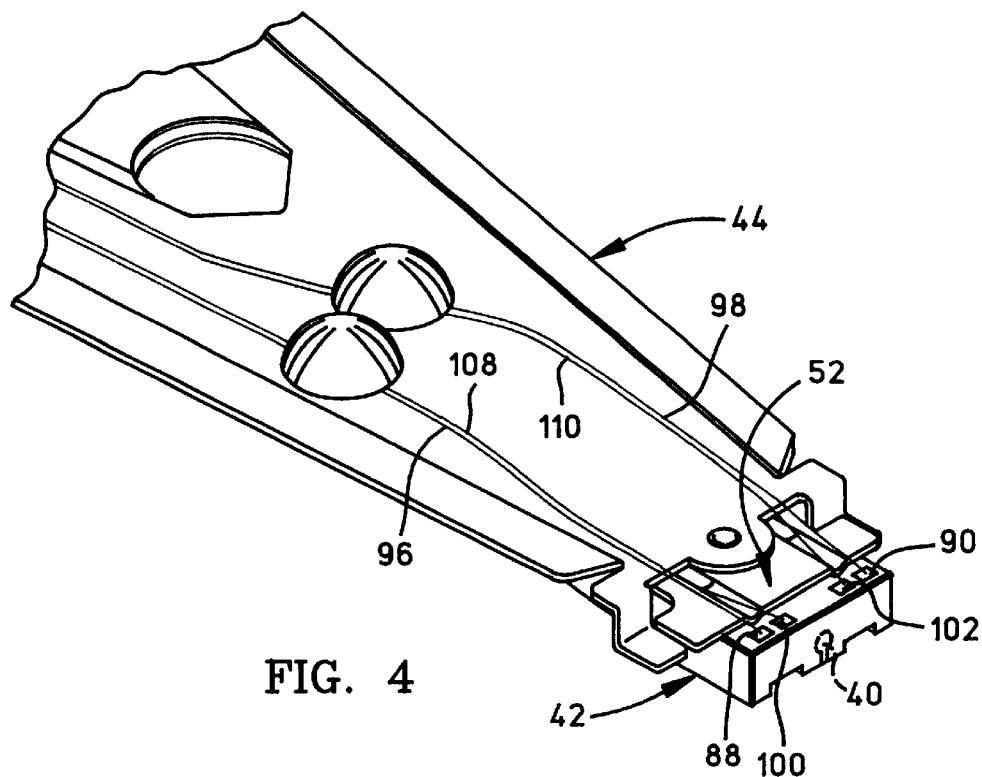
FIG. 4 is an isometric illustration of an exemplary suspension system for supporting the slider and magnetic head.

Magnetic head 40 may be employed for writing information to multiple circular tracks on the surface of disk 34, as well as for reading information therefrom. Processing circuitry 50 exchanges signals representing such information with magnetic head 40, provides motor drive signals, and also provides control signals for moving slider 42 to various tracks. In FIGS. 1 and 4, slider 42 is shown mounted to a head gimbal assembly (HGA) 52 that is mounted to suspension 44. All of the above components are supported on a base 53.

Figure 7:
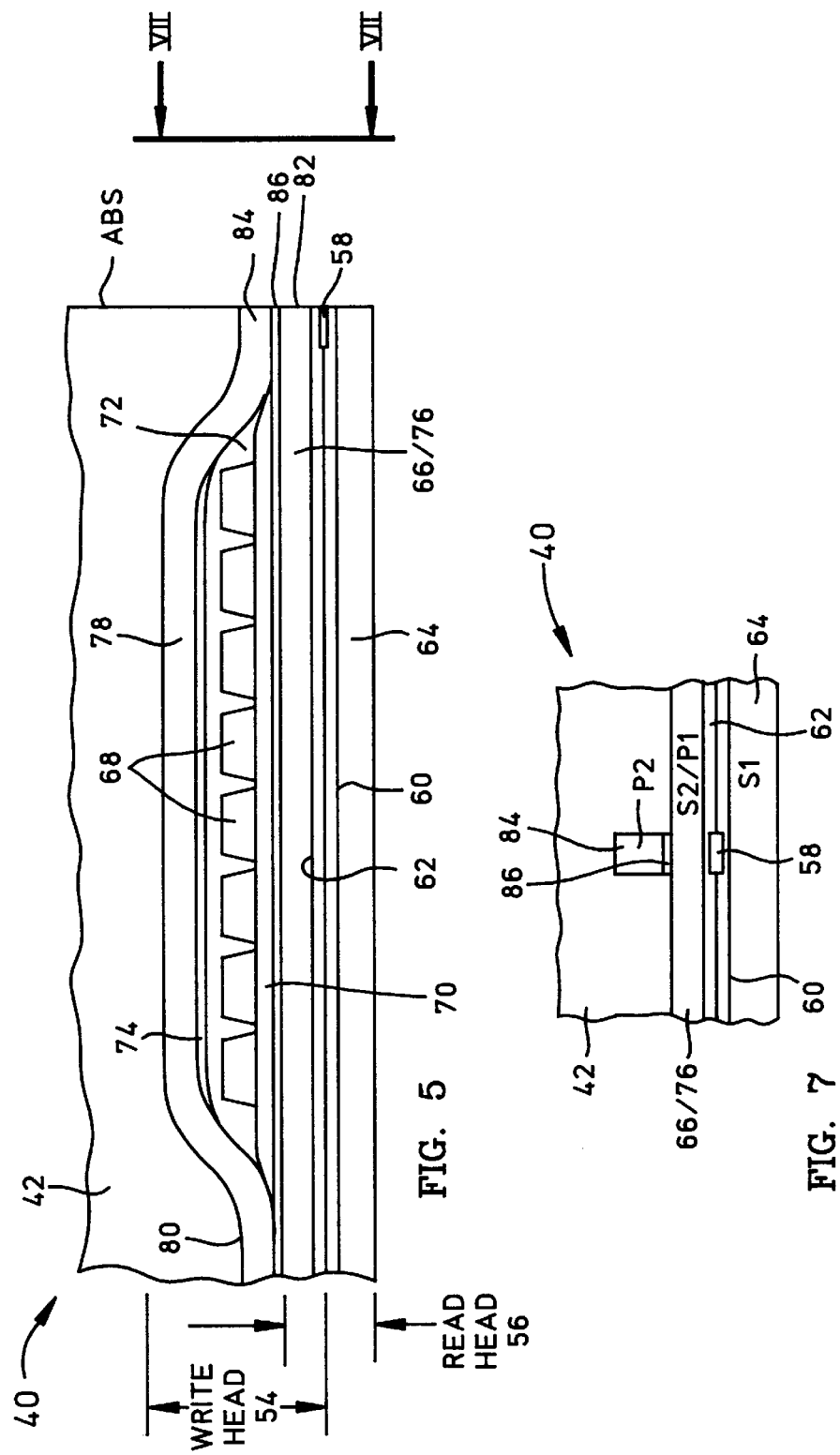
FIG. 7 is a partial ABS view of the slider taken along plane VII—VII of FIG. 5 to show the read and write elements of the magnetic head.

FIG. 5 is a side cross-sectional elevation view of a merged read/write head 40 which has a write head portion 54 and a read head portion 56. Note also the partial ABS view of head 40 in FIG. 7. Read head portion includes a giant magnetoresistive read (GMR) sensor 58. GMR sensor 58 is sandwiched between first and second gap layers 60 and 62 that are, in turn, sandwiched between first and second shield layers 64 and 66. In response to external magnetic fields, the resistance of GMR sensor 58 changes. A sense current conducted through the sensor causes these resistance changes to be manifested as potential changes, which are processed by processing circuitry 50 (FIG. 3).

Figure 6:
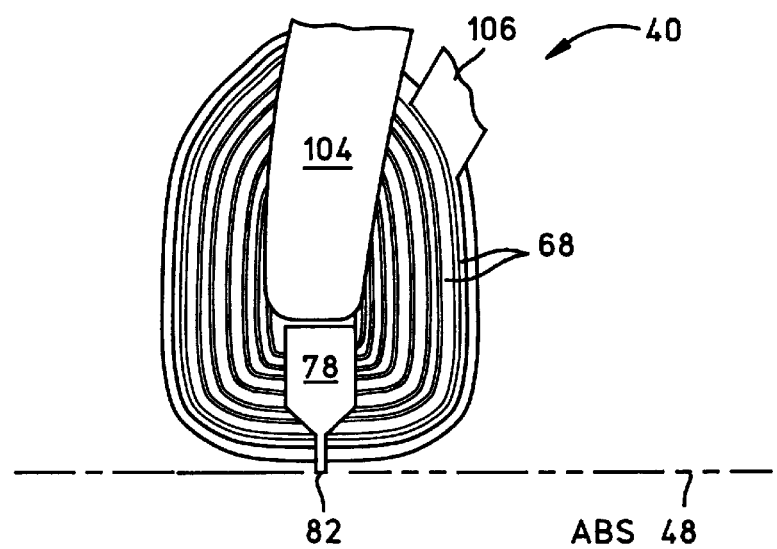
FIG. 6 is a top view of the second pole piece and coil layer, a portion of which is shown in FIG. 5, with all insulation material removed.

Write head portion 54 of the head includes a coil layer 68 sandwiched between first and second insulation layers 70 and 72. A third insulation layer 74 may be employed for planarizing the head to eliminate ripples in the second insulation layer caused by coil layer 68. The first, second and third insulation layers are referred to as an "insulation stack". Coil layer 68, and first, second and third insulation layers 70, 72 and 74, are sandwiched between first and second pole piece layers 76 and 78. The first and second pole piece layers 76 and 78 are magnetically coupled at a back gap 80, and have first and second pole tips 82 and 84 that are separated by a non-magnetic gap layer 86 at the ABS. As shown in FIGS. 2 and 4, first and second solder connections 88 and 90 connect leads (not shown) from GMR sensor 58 to leads 96 and 98 on suspension 44; third and fourth solder connections 100 and 102 connect leads 104 and 106 from coil 68 (see FIG. 6) to leads 108 and 110 on the suspension.

FIGS. 8–16 are illustrations which describe methods and apparatus for preventing damage to read sensors caused by electrostatic discharge (ESD) during the manufacture of magnetic heads. Such methods and apparatus may be utilized in connection with the manufacturing of disk drive 30 previously described in relation to FIGS. 1–7.

Figure 8:
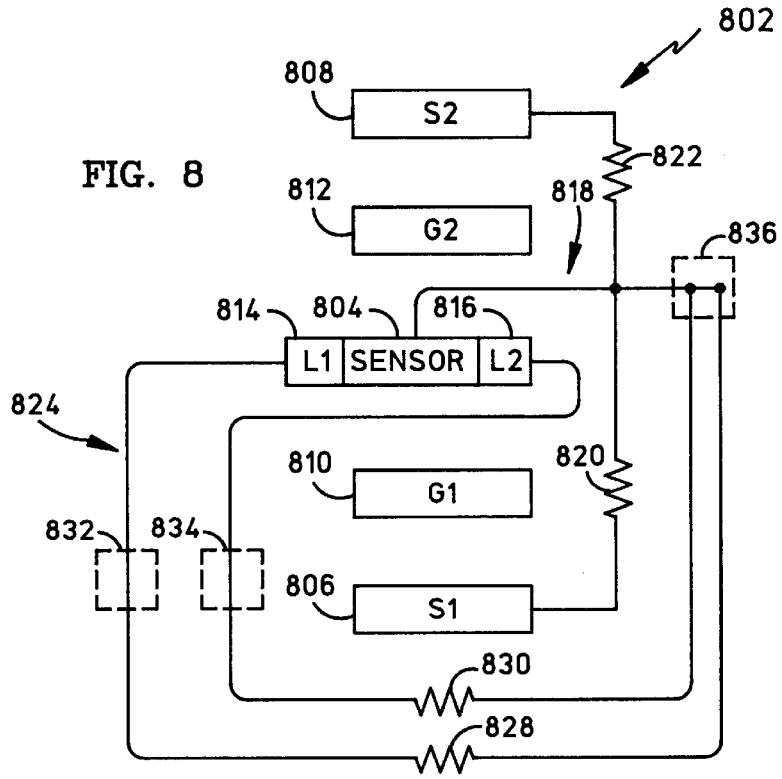
FIG. 8 is an illustration of electrical connections formed in the magnetic head to prevent electrostatic discharge (ESD) damage.

Referring first to FIG. 8, an illustration showing electrical connections which are made for the purpose of preventing ESD damage to a read sensor 804 of a magnetic head 802 during its manufacture is shown. Before discussing these electrical connections, the basic conventional makeup of magnetic head 802 will be described first. Although only one magnetic head 802 is shown in FIG. 8, it is representative of a plurality of magnetic heads which are being formed on a wafer during manufacturing. Read sensor 804 is formed over a first gap layer 810 which has a first shield layer 806 formed beneath it. Above read sensor 804 is a second gap layer 812 which has a second shield layer 808 formed over it. First and second gap layers 810 and 812 are made of any suitable insulating material, such as alumina. First and second shield layers 806 and 808 are made of any suitable soft magnetic material, such as Permalloy.

Since the conductive materials of read sensor 804 and shield layers 806 and 808 are separated by the insulating materials of gap layers 810 and 810, different electrical potentials may exist between read sensor 804 and shield layers 806 and 808 (assuming no safeguards are in place). Thus, during the manufacture and constant handling of magnetic head 802, electrostatic charge may undesirably build up and damage read sensor 804, which is a sensitive device.

To mitigate this problem, special electrical connections are formed in magnetic head 802 during manufacturing. For one, a first electrical connection 818 is made between read sensor 804 and first and second shields 806 and 808. In this connection, a resistance 820 exists from read sensor 804 to first shield 806 and a resistance 822 exists from read sensor 804 to second shield 808. Preferably, resistances 820 and 822 are sufficiently low resistances to prevent build-up of electrostatic charge, generally 1 MΩ or less. Any suitable method to form this first connection 818 may be utilized. Preferably, conventional photolithography and patterning techniques are used during head formation to form holes through gap layers 810 and 812 and extend sensor materials of read sensor 804 through the holes to make electrical contact with first and second shields 806 and 808. In this case, resistances 820 and 822 which are created are inherent to the nature and the amount of materials utilized in the connection.

A second electrical connection 824 is also created between sensor leads 814 and 816 and first and second shields 806 and 808. In this connection, a resistance 828 exists from sensor lead 814 and a resistance 830 exists from sensor lead 816. Preferably, these resistances 828 and 830 are large enough to allow for testing of the sensor (i.e., the sum of resistances 828 and 830 is on the order of or larger than the resistance of the sensor, but still less than 1 MΩ). Resistances 828 and 830 are also preferably small enough to provide significant ESD protection for current flowing though the sensor (e.g., 2–100 Ω). Thus, second connection 824 forms a temporary parallel current path between the sensor leads.

Any suitable method to create this connection may be utilized. Preferably, second connection 824 is made with use of conductive traces and conductive pads (regions) which are formed on an outer surface of magnetic head 802. In particular, a connection to the existing connection between first and second shields 820 and 822 is routed to a conductive pad 836 formed on an outer surface of magnetic head 802. Conductive pad 836 lies adjacent to conductive pads 832 and 834 of read sensor 804 which are also formed on the outer surface of magnetic head 802. Conductive pad 836 is coupled to conductive pads 832 and 834 via electrical traces.

Figure 9:
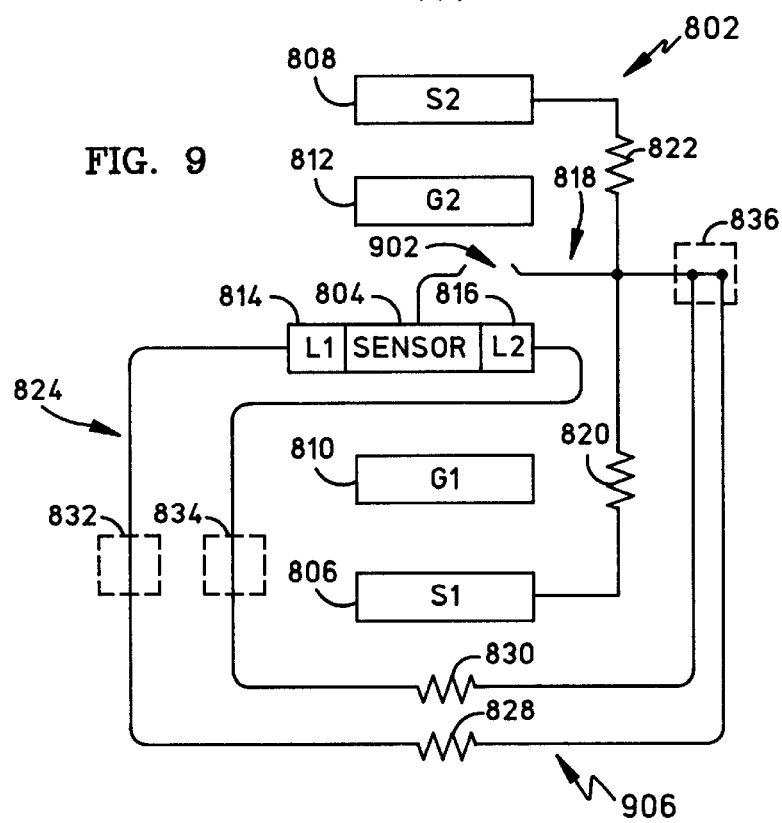
FIG. 9 is an illustration of the electrical connections of FIG. 8, but with the connections severed so that the magnetic heads can be utilized as intended.

Both first and second connections 818 and 824 are used to protect the read sensors from ESD damage during most of manufacturing, keeping the read sensors at the same electrical potential as the shields. However, first connection 818 crosses over a contemplated air bearing surface (ABS) line of the plurality of magnetic heads (which includes magnetic head 802) being formed on the wafer. Eventually, the wafer is cut and lapped along the ABS line to form the ABS for each of the magnetic heads. Thus, first connection 818 will be severed during the cutting or lapping. FIG. 9 shows a severed connection 902 which represents this break in electrical continuity between read sensor 804 and first and second shields 806 and 808.

On the other hand, the electrical traces of the second connection which couple conductive pads 832 and 834 to conductive pad 836 are severed late in the manufacturing process, after the cutting and lapping of the ABS. Preferably, the electrical traces are severed during the final stages of manufacturing, after the wafer is cut to separate the plurality of magnetic heads from each other. FIG. 9 shows a severed connection 906 which represents this break in electrical continuity between sensor leads 814 and 816 and first and second shields 806 and 808. Preferably, the electrical traces are severed with use of a laser beam. Also preferably, resistors 828 and 830 are thin film resistors which are formed on the outer surface and are severed or "laser deleted" by the laser beam.

Thus, prior to the cutting and lapping along the contemplated ABS line, the read sensors are protected from ESD damage by both first connection 818 and second connection 824. After the cutting and lapping of the ABS, and during the cutting of the wafer to create individual magnetic heads and the subsequent handling thereof, the read sensors are protected from ESD damage by second connection 824.

Figure 10:
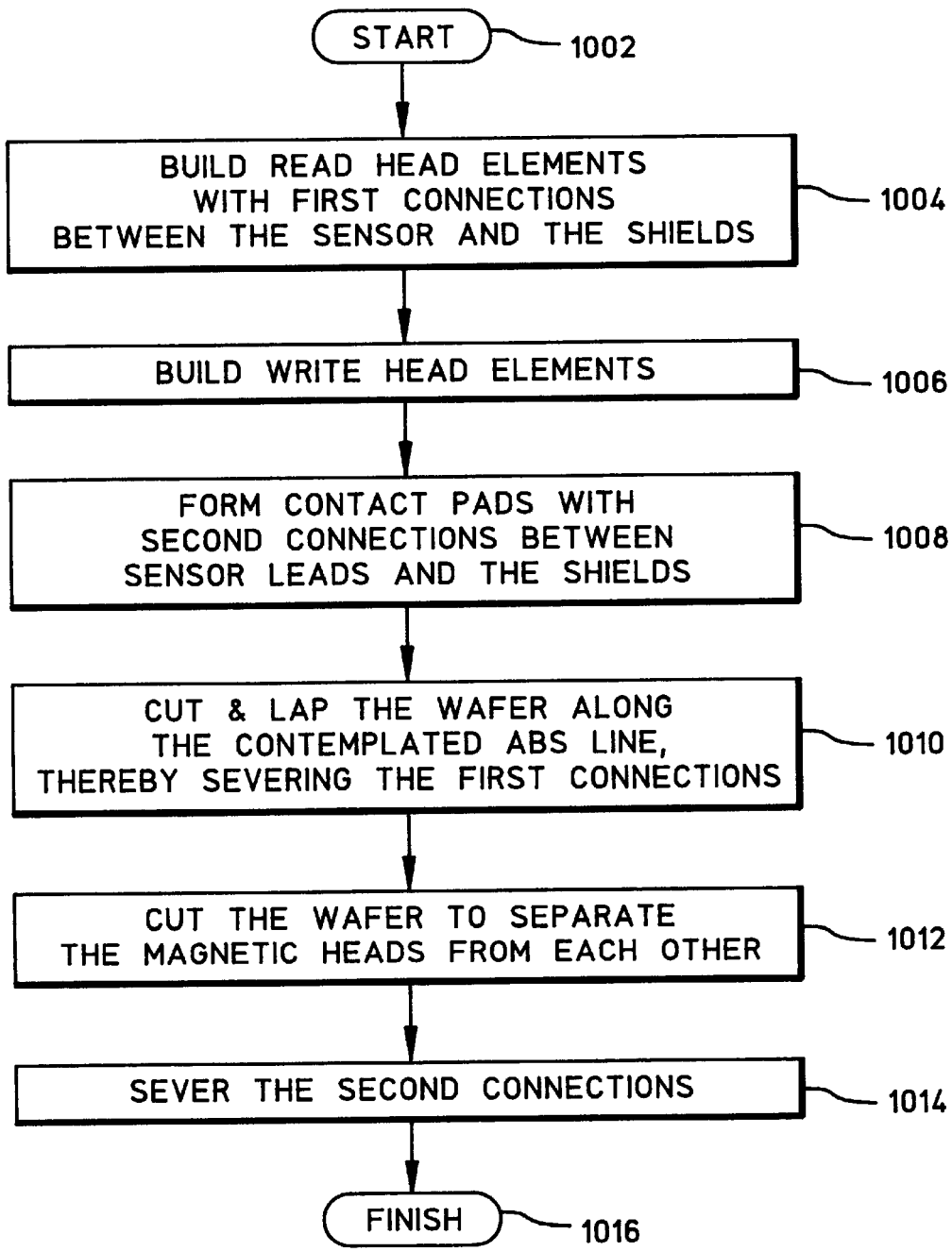
FIG. 10 is a flowchart which describes a method of manufacturing a magnetic head with the electrical connections of FIGS. 8 and 9.

FIG. 10 is a flowchart which describes the basic method of manufacturing a plurality of magnetic heads using the first and the second connections to prevent ESD damage. Beginning at a start block 1002, read elements for a plurality of magnetic heads are formed on a wafer (step 1004). Each read element includes conventional read head layers (shield layers, sensor layers, gap layers, etc.), as well as the first connection described above in relation to FIG. 8 for ESD protection. Write elements are then formed adjacent to each read element on the wafer (step 1006). Next, contact pads with the connecting electrical traces for the second connection are formed on the outside surface of each magnetic head (step 1008). Thereafter, ESD damage is prevented by both the first and the second connections.

The wafer is eventually cut and lapped along the contemplated ABS line to form the ABS, which severs each first connection (step 1010). Thereafter, ESD damage is prevented only by the second connection. The wafer is then eventually cut to separate the plurality of magnetic heads from each other so that they can be processed individually (step 1012). Finally, late in the manufacturing process, each exposed second connection is severed (step 1014), preferably by laser deletion. Thereafter, ESD damage is not prevented by any connection as the magnetic heads are now usable for their intended purpose. The flowchart ends at a finish block 1016.

Figure 11:
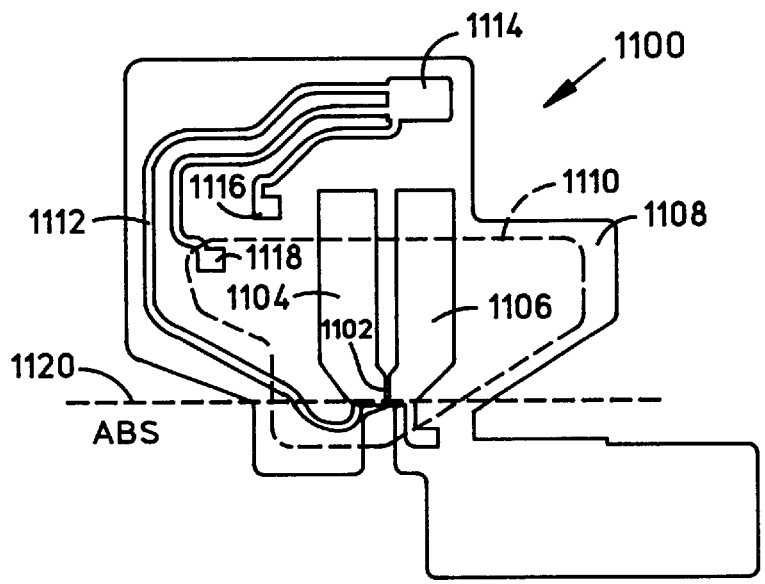
FIG. 11 is the first in a series of layers of a magnetic head which has electrical connections to prevent ESD damage.
Figure 12:
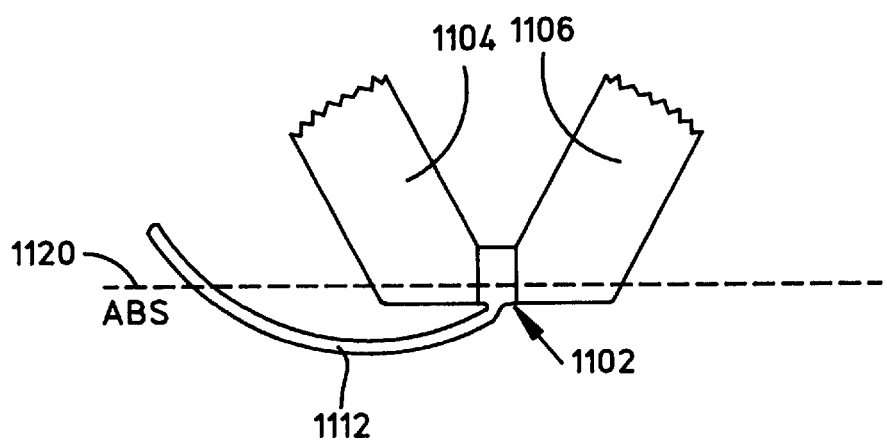
FIG. 12 is a close-up view of a portion of the first layer of FIG. 11.

FIGS. 11–16 are illustrations of separately formed layers of a magnetic head having first and second electrical connections in one embodiment of the present invention. Referring first to FIG. 11, a first layer 1100 reveals a first shield 1108 and a second shield 1110 which surround a read sensor 1102 having sensor leads 1104 and 1106. A first electrical connection is made between read sensor 1102 and shields 1108 and 1110 via an electrical trace 1112 which is coupled to a connecting pad 1114, which is itself coupled to shields 1108 and 1110 via two electrical traces and pads 1116 and 1118. Read sensor 1102 and electrical trace 1112 cross over a contemplated ABS line 1120 of the magnetic head. A close-up in FIG. 12 shows read sensor 1102, sensor leads 1104 and 1106, and first connection 1120 relative to this contemplated ABS line 1120.

Figure 13:
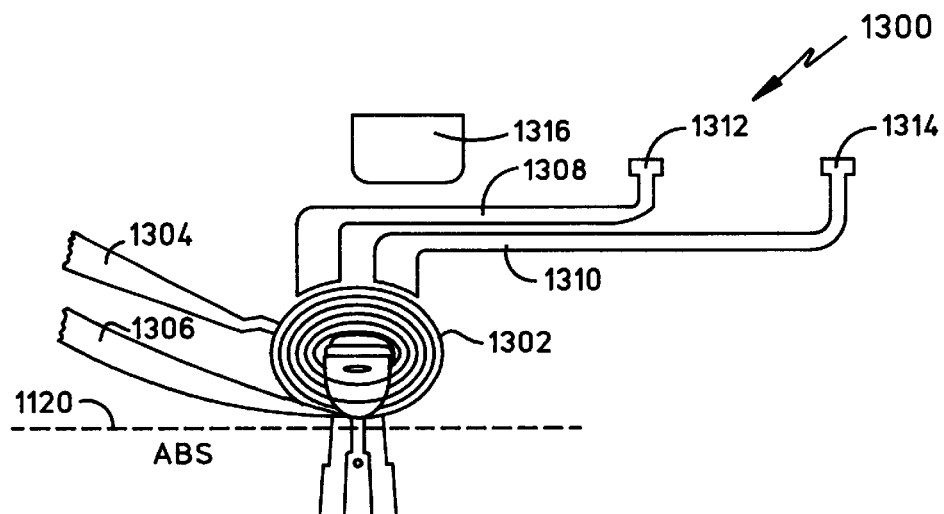
FIG. 13 is an illustration of a second layer of the magnetic head which has the electrical connections.
Figure 14:
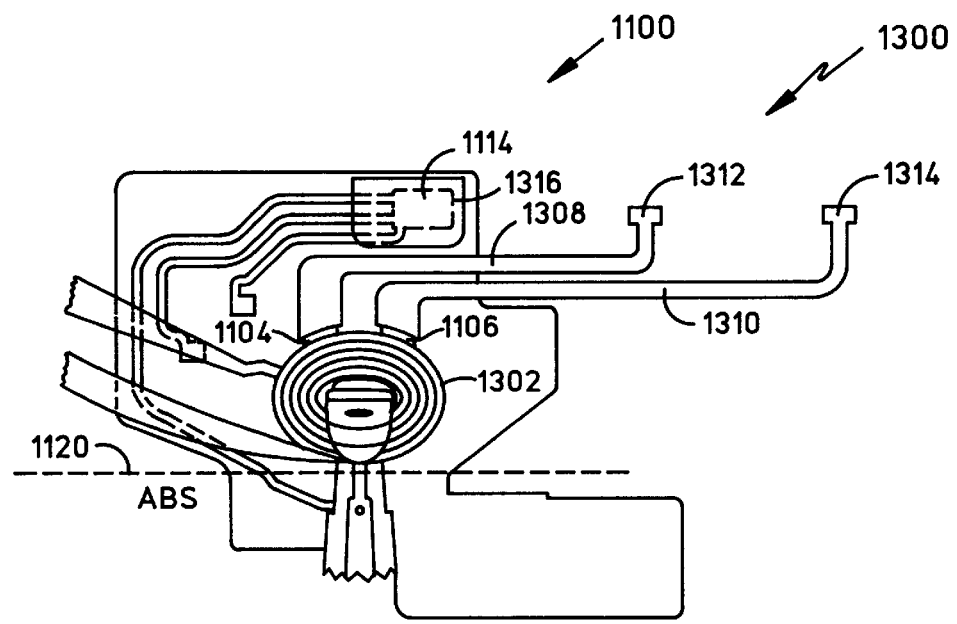
FIG. 14 is an illustration of the interface between the first layer of FIG. 11 and the second layer of FIG. 13.

In FIG. 13, a second layer 1300 shows a write coil 1302 with write leads 1304 and 1306. Write coil 1302 is formed over the read sensor, which is not shown in FIG. 13. Read leads 1308 and 1310 from the read sensor have connecting leads 1312 and 1314 for reaching an upper layer (not yet shown). Another connecting pad 1316 to the upper layer is also formed in second layer 1300. FIG. 14 shows the interface between this second layer 1300 of FIG. 13 and first layer 1100 of FIG. 11. Sensor leads 1104 and 1106 of first layer 1100 make electrical contact with read leads 1308 and 1310 of second layer 1300. For the second connection, connecting pad 1114 of first layer 1110 makes contact with connecting pad 1316 of second layer 1300.

Figure 15:
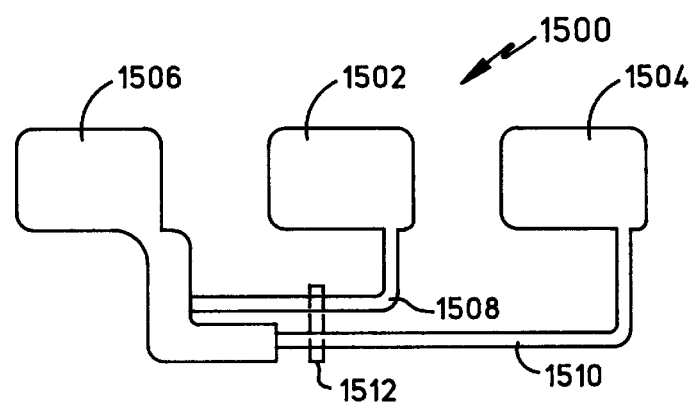
FIG. 15 is an illustration of a third layer (outside layer) of the magnetic head which has the electrical connections.
Figure 16:
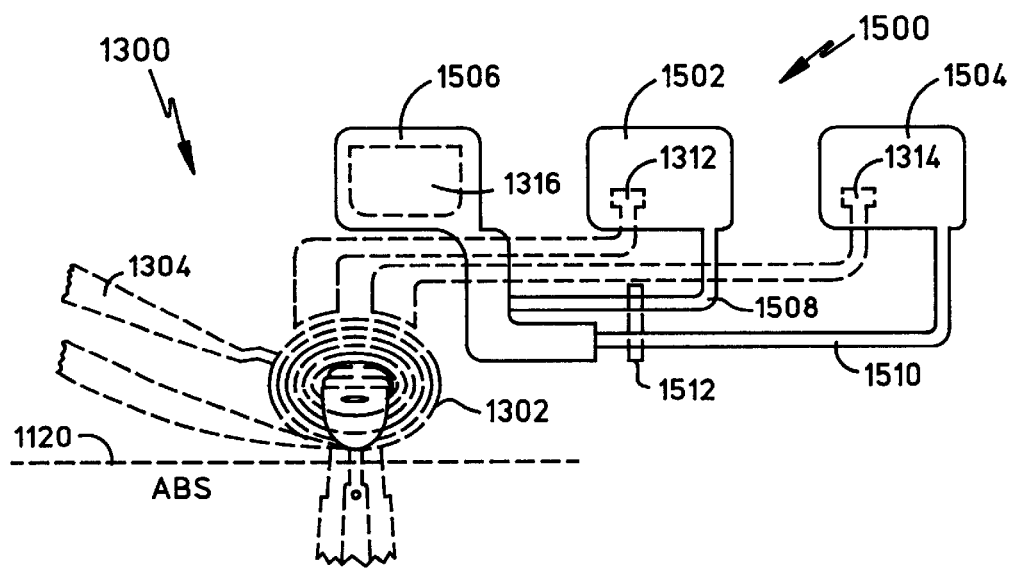
FIG. 16 is an illustration of the interface between the second layer of FIG. 13 and the third layer of FIG. 15.

FIG. 15 shows a third layer 1500 which constitutes the outside surface of the magnetic head. Read pads 1502 and 1504 as well as a connecting pad 1506 are formed on the outside surface. Connecting pad 1506 is electrically coupled to both read pads 1502 and 1504 via electrical traces 1508 and 1510. Electrical traces 1508 and 1510 include thin film resistors which are formed using well-known conventional processes. FIG. 16 shows the interface between third layer 1500 of FIG. 15 and second layer of FIG. 14. Connecting leads 1312 and 1314 of second layer 1300 make electrical contact with read pads 1502 and 1504. In addition, connecting pad 1316 of second layer 1300 makes electrical contact with connecting pad 1506 of third layer 1500. This completes the second connection between the sensor leads and the shields. The second connection is severed late in the manufacturing process in a region 1512 by a laser.

Thus, improved methods and apparatus for protecting read sensors from damage caused by ESD during manufacturing have been described. Prior art methods fail to prevent ESD damage to read sensors during later phases of manufacturing (i.e., after cutting and lapping the ABS). Since the connection of the prior art is buried within the read sensor, it is difficult if not impossible to sever it late in the manufacturing process. According to the present invention, two electrical connections are formed and utilized for ESD protection: one primarily for early protection of the sensors (i.e. prior to cutting and lapping the wafer to form the ABS) and the other primarily for later protection of the sensors (i.e. after cutting and lapping the wafer to form the ABS). The first electrical connection is created between the read sensor and first and second shields, and is severed when the wafer is cut and lapped along the ABS. The second electrical connection is formed between sensor leads and the first and the second shields, and is exposed on an outside surface of the magnetic head. The second electrical connection is severed late in the manufacturing process, preferably by laser-deletion.

It is to be understood that the above is merely a description of preferred embodiments of the invention and that various changes, alterations, and variations may be made without departing from the true spirit and scope of the invention as set for in the appended claims. None of the terms or phrases in the specification and claims has been given any special particular meaning different from the plain language meaning to those skilled in the art, and therefore the specification is not to be used to define terms in an unduly narrow sense.

What is claimed is:

1. A method of protecting read sensors from damage caused by electrostatic discharge (ESD) during manufacturing, the method comprising the acts of:

creating a first electrical connection between a read sensor and first and second shields for each one of a plurality of magnetic heads being formed on a wafer, the first electrical connections crossing over a contemplated air bearing surface (ABS) line; and creating a second electrical connection between leads from the read sensor and the first and the second shields for each one of the plurality of magnetic heads being formed on the wafer, the second electrical connections being outwardly exposed on the plurality of magnetic heads being formed.

2. The method of claim 1, further comprising the acts of:
cutting and lapping the wafer along the contemplated ABS line to form the ABS, thereby severing the first electrical connections of the plurality of magnetic heads being formed on the wafer.

3. The method of claim 1, further comprising the acts of:
cutting and lapping the wafer along the contemplated ABS line to form the ABS, thereby severing the first electrical connections of the plurality of magnetic heads being formed on the wafer; and
maintaining the second electrical connections of the plurality of magnetic heads being formed on the wafer.

4. The method of claim 1, further comprising the acts of:
cutting and lapping the wafer along the contemplated ABS line to form the ABS, thereby severing the first electrical connections of the plurality of magnetic heads being formed on the wafer; and
breaking or cutting the wafer to separate the plurality of magnetic heads from each other.

5. The method of claim 1, further comprising the acts of:
cutting and lapping the wafer along the contemplated ABS line to form the ABS, thereby severing the first electrical connections of the plurality of magnetic heads being formed on the wafer;
breaking or cutting the wafer to separate the plurality of magnetic heads from each other; and
after separating the magnetic heads from each other, severing the exposed second electrical connections.

6. The method of claim 5, wherein the act of severing the exposed second electrical connections comprises the further act of severing with use of a laser.

7. The method of claim 1, wherein the act of creating the second electrical connections comprises the further act of forming thin-film resistors in the second electrical connections.

8. A method of protecting read sensors from damage caused by electrostatic discharge (ESD) during manufacturing, the method comprising the acts of:

creating an electrical connection between leads from a read sensor and first and second shields for each one of a plurality of magnetic heads being formed on a wafer, the electrical connections being outwardly exposed on the plurality of magnetic heads being formed;

breaking or cutting the wafer to separate the plurality of magnetic heads from each other; and after separating the magnetic heads from each other, severing the exposed electrical connections.

9. The method of claim 8, wherein the act of creating each electrical connection comprises the further acts of forming first and second conductive pads which are outwardly exposed on the plurality of magnetic heads and coupled to the leads from the read sensor, forming a third conductive pad which is outwardly exposed and coupled to the first and the second shields, and creating the exposed electrical connection between the third conductive pad and the first and the second conductive pads.

10. The method of claim 8, wherein prior to the act of separating the magnetic heads from each other, the method comprises the further acts of:

forming another electrical connection between the read sensor and the first and the second shields for each one of the plurality of magnetic heads being formed on the wafer, the other electrical connections crossing over a contemplated air beating surface (ABS) line; and cutting and lapping the wafer along the contemplated ABS line to form an ABS, thereby severing the other electrical connections.

11. The method of claim 8, wherein the act of creating the electrical connections comprises the further act of forming thin-film resistors in the electrical connections.

12. The method of claim 8, wherein the act of severing the exposed second electrical connections comprises the further act of severing with use of a laser.

13. A magnetic head, comprising:

first and second shields;

a read sensor formed between the first and the second shields;

first, second, and third conductive regions on an outer surface of the magnetic head;

the first and second conductive regions coupled to leads of the read sensor;

the third conductive region coupled to the first and second shields;

a first severed conductive path between the first and the third conductive regions on the outer surface of the magnetic head; and a second severed conductive path between the second and the third conductive regions on the outer surface of the magnetic head.

14. The magnetic head of claim 13, wherein the first, the second, and the third conductive regions comprise conductive pads.

15. The magnetic head of claim 13, wherein the first and the second severed conductive paths comprise severed conductive traces.

16. The magnetic head of claim 13, wherein the first and the second severed conductive paths comprise thin film resistors.

17. The magnetic head of claim 13, further comprising:
a third severed conductive path between the read sensor and the first and the second shields.

18. A magnetic head, comprising:

first and second shields;

a read sensor formed between the first and the second shields;

first, second, and third conductive regions on an outer surface of the magnetic head;

the first and second conductive regions coupled to the read sensor;

the third conductive region coupled to the first and second shields;

a first conductive trace between the first and the third conductive regions on the outer surface of the magnetic head; and a second conductive trace between the second and the third conductive regions on the outer surface of the magnetic head.

19. The magnetic head of claim 18, wherein the first and the second conductive traces are severed.

20. The magnetic head of claim 18, wherein the first conductive trace comprises a first thin film resistor and the second conductive trace comprises a second thin film resistor.

* * * * *

UNITED STATES PATENT AND TRADEMARK OFFICE
CERTIFICATE OF CORRECTION

PATENT NO. : 6,795,278 B2
DATED : September 21, 2004
INVENTOR(S) : Jarratt et al.

It is certified that error appears in the above-identified patent and that said Letters Patent is hereby corrected as shown below:

Title page,
Item [75], Inventors, replace "Jarret" with -- Jarrat --

Column 8,
Line 8, replace "beating" with -- bearing --

Signed and Sealed this

Ninth Day of November, 2004

JON W. DUDAS
*Director of the United States Patent and Trademark Office*